United States Patent
Pantelias (10) Patent No.: US 8,204,074 B2
(45) Date of Patent: Jun. 19, 2012

(54) FLEXIBLE MAC/PHY ASSOCIATION (75) Inventor: Niki Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 803 days.

(21) Appl. No.: 11/759,762

(22) Filed: Jun. 7, 2007

(65) Prior Publication Data

US 2007/0286192 A1  Dec. 13, 2007

Related U.S. Application Data (60) Provisional application No. 60/811,431, filed on Jun. 7, 2006.

(51) Int. Cl.
*H04L 12/66* (2006.01)
*H04L 12/28* (2006.01)
*H04L 12/56* (2006.01)
*H04M 1/66* (2006.01)

(52) U.S. Cl. ........ 370/463; 370/401; 370/419; 370/420; 455/411

(58) Field of Classification Search .................. 370/446, 370/428, 498, 420, 248, 463, 445, 419, 401, 370/501, 395.32, 335; 455/411
See application file for complete search history.

(56) References Cited

U.S. PATENT DOCUMENTS

| | | | | |
|---|---|---|---|---|
| 5,023,872 A * | 6/1991 | Annamalai | ................ | 714/704 |
| 5,754,540 A * | 5/1998 | Liu et al. | .................. | 370/315 |
| 5,953,345 A * | 9/1999 | Findlater et al. | ......... | 370/446 |
| 6,094,439 A * | 7/2000 | Krishna et al. | ............. | 370/445 |
| 6,108,726 A * | 8/2000 | Runaldue et al. | ............. | 710/62 |
| 6,507,591 B1 * | 1/2003 | Bray | .................. | 370/501 |
| 6,631,138 B1 * | 10/2003 | Findlater et al. | ......... | 370/446 |
| 7,283,481 B2 * | 10/2007 | Huff | ..................... | 370/248 |
| 7,330,655 B2 * | 2/2008 | Kim et al. | ................. | 398/72 |
| 7,606,243 B2 * | 10/2009 | Takabatake et al. | ....... | 370/401 |
| 7,672,300 B1 * | 3/2010 | Medina et al. | ............... | 370/366 |
| 2002/0078249 A1 * | 6/2002 | Lu et al. | .................. | 709/310 |
| 2002/0126684 A1 * | 9/2002 | Findlater et al. | ......... | 370/419 |
| 2002/0131426 A1 * | 9/2002 | Amit et al. | ............... | 370/401 |
| 2003/0063611 A1 * | 4/2003 | Schaub et al. | ......... | 370/395.32 |
| 2003/0099253 A1 * | 5/2003 | Kim | ....................... | 370/462 |
| 2003/0174678 A1 * | 9/2003 | Chang et al. | ............. | 370/335 |
| 2003/0179711 A1 * | 9/2003 | Huff | ..................... | 370/248 |
| 2003/0182434 A1 * | 9/2003 | Ogushi et al. | ............. | 709/228 |
| 2003/0217182 A1 * | 11/2003 | Liu et al. | .................. | 709/249 |
| 2005/0118985 A1 * | 6/2005 | Takabatake et al. | ....... | 455/411 |
| 2006/0104300 A1 * | 5/2006 | Ho | ........................ | 370/428 |

(Continued)

OTHER PUBLICATIONS

Doerr et al. (MultiMAC—An Adaptive MAC Framework for Dynamic Radio Networking; Department of Computer Science University of Colorado at Boulder Boulder, CO 80309; 2005, hereinafter Doerr).*

*Primary Examiner* — Ayaz Sheikh
*Assistant Examiner* — Sori Aga
(74) *Attorney, Agent, or Firm* — Sterne, Kessler, Goldstein & Fox, P.L.L.C.

(57) ABSTRACT

A system and method for allowing flexible associations between PHY devices and MAC devices in a point-to-multipoint communications system, such that a given upstream channel is not deterministically bound to a particular MAC device. An upstream MAC device may connect to a varying number of PITY devices depending on configured PHY capacity. Upstream service flows are kept intact by noting Service identifiers (SIDs) of each burst received at a PHY device. A burst is then directed via a switching infrastructure to the appropriate MAC on the basis of the SID.

18 Claims, 5 Drawing Sheets

U.S. PATENT DOCUMENTS

| | | | |
|---|---|---|---|
| 2006/0126847 A1* | 6/2006 | Ho | 380/277 |
| 2007/0157060 A1* | 7/2007 | Ganga et al. | 714/752 |
| 2007/0160087 A1* | 7/2007 | Findlater et al. | 370/498 |
| 2007/0165663 A1* | 7/2007 | Aloni et al. | 370/420 |
| 2007/0237270 A1* | 10/2007 | Mezer et al. | 375/346 |
| 2008/0069004 A1* | 3/2008 | Huff | 370/248 |
| 2009/0022175 A1* | 1/2009 | Logvinov et al. | 370/463 |
| 2009/0185574 A1* | 7/2009 | Chapman et al. | 370/419 |

* cited by examiner

FLEXIBLE MAC/PHY ASSOCIATION

CROSS REFERENCE TO RELATED APPLICATION

The present application claims the benefit of U.S. Provisional Patent Application No. 60/811,431, filed on Jun. 7, 2006, which is incorporated herein by reference in its entirety.

BACKGROUND OF THE INVENTION

1. Field of the Invention

The invention described herein relates to communications processing, and in particular relates to dynamic control and processing of data in the physical layer and media access control processing.

2. Background Art

In point-to-multipoint communications systems such as those operating under a version of the Data Over Cable Service Interface Specification (DOCSIS), communications that are sent from user equipment to a central controller are processed through a layered protocol stack. An example of such user equipment is a cable modem; an example of a central controller is a cable modem termination system (CMTS). Processing at a CMTS includes physical layer (PHY) processing and media access control layer (MAC) processing.

In current systems, bursts are received at a CMTS from one or more cable modems. PHY processing is performed at the CMTS by logic such as that embodied by the BCM3140 device, produced by Broadcom Corporation of Irvine, Calif. Data output from the PHY device is then forwarded to a MAC device (such as the BCM3214 device, also from Broadcom) for subsequent processing, such as fragment reassembly and decryption. A CMTS will typically have several PHY devices and several MAC devices.

In current systems, the number of incoming channels that are mapped to a PHY device is fixed, and the particular PHY devices connected to a MAC device are fixed. Efficiency issues arise when, for example, the PHY devices assigned to a MAC device fail to utilize all the capacity of the MAC. In this case, MAC capacity is wasted. If a second MAC is potentially overloaded, there is no way to balance the load and maintain system-wide throughput, because the mapping of PHY devices to MAC devices is fixed. If PHY devices are hardwired with a MAC device on a single card, the addition of another card may be necessary to handle the extra traffic.

The problem worsens in DOCSIS 2.0 and 3.0 systems. Here, the concept of bonding groups is available. Channel bonding allows a single cable modem to transmit upstream over more than one channel. The channels used by the cable modem are therefore associated, and must be treated as a bonded group at the MAC processing level. A problem arises if a bonding group includes some channels assigned to one MAC device, and other channels assigned to a second MAC device. In this case, neither MAC device sees (i.e., is capable of detecting) all channels of the bonding group. A related problem arises if a bonding group has more channels than a MAC device can normally handle. A group might consist of six channels, for example, while MAC devices are limited to handling four channels each. In this case, no single MAC device could handle all channels of the bonding group.

What is needed, therefore, is a system and method wherein MAC and PHY devices can flexibly and efficiently handle variations in loading brought about by traffic conditions and/or systemic configurations such as channel bonding.

BRIEF SUMMARY OF THE INVENTION

The invention described herein is a system and method for allowing flexible associations between PHY devices and MAC devices in a point-to-multipoint communications system, such that a given upstream channel is not deterministically bound to a particular MAC device. An upstream MAC device may connect to a varying number of PHY devices depending on configured PHY capacity. Upstream service flows are kept intact by noting the service identifiers (SIDs) of each burst received at a PHY device. A burst is then directed via a switching infrastructure to the appropriate MAC on the basis of the SID associated with the burst.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

Further embodiments, features, and advantages of the present invention, as well as the operation of the various embodiments of the present invention, are described below with reference to the accompanying drawings.

DETAILED DESCRIPTION OF THE INVENTION

Embodiments of the present invention are now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The following describes a system and method for allowing flexible associations between PHY devices and MAC devices in a point-to-multipoint system, such that a given upstream channel is not deterministically bound to a particular MAC device. An upstream MAC device may connect to a varying number of PHY devices depending on configured PHY capacity. Upstream service flows are kept intact by noting service IDs (SIDs) of each burst received at a PHY device. A burst is then directed via a switching infrastructure to the appropriate MAC on the basis of the SID associated with the burst. Although SIDs are being used here as an example, other protocol elements and/or data formats, particular to a communication protocol, may be used to identify the service flow on a channel and/or identify sender of data packet(s). For example, an Ethernet address or an IP source address may be used for such purposes.

Figure 1:
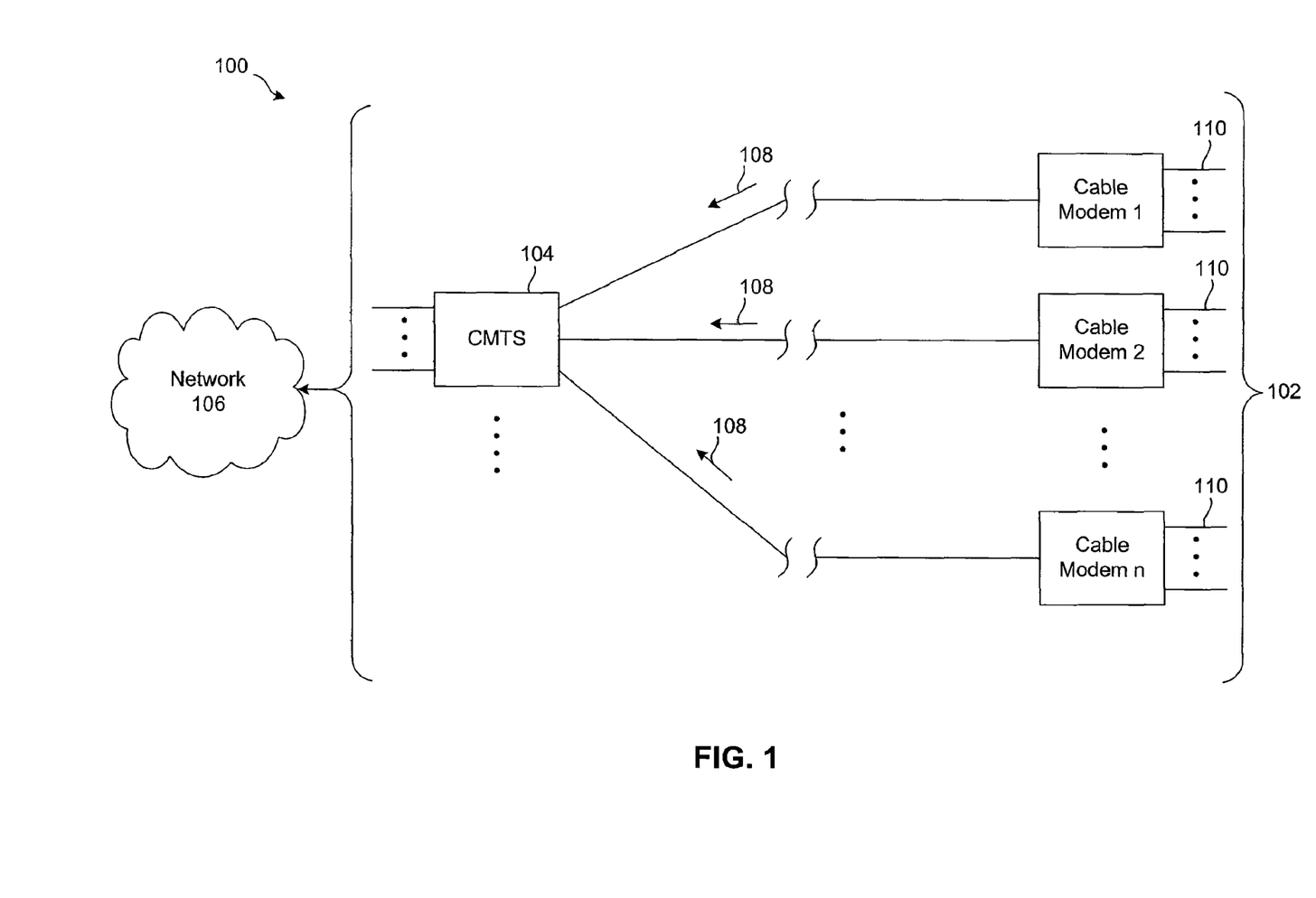
FIG. 1 illustrates an exemplary environment in which an embodiment of the present invention can be implemented.

FIG. 1 illustrates an exemplary environment in which the present invention, according to one embodiment, may be implemented. FIG. 1 shows a setup 100 comprising a set 102 of cable modems communicating with a cable modem termination systems (CMTS) 104 via a communication link comprising, for example, a Hybrid Fiber-Coaxial cable network. Although the communication link discussed herein is the HFC but it could also be wireless, satellite, optical, or any other network or combinations of networks. Network 106 can be the Internet, a local area network (LAN), a wide area network (WAN), a storage area network (SAN) well known to one skilled in the art. Cable modems 102 can also be connected to televisions, set-top boxes, personal computers, switches, servers, cellular networks, or other communications equipments well known to those skilled in the art, via ports 110. Set 102 of cable modems can send bandwidth requests to CMTS 104. Such upstream data constitute, among other things, bandwidth requests where the term upstream is graphically shown by arrows 108. Further, such bandwidth requests can arise due to many reasons like initiation of a web-browsing session, request for data transfer, request for a telephone connection path, or any reasons as can be contemplated by those skilled in the art. Further still, such bandwidth requests can be made in a regular manner or in a burst manner, or in any other manner known to those skilled in the art. CMTS 104, further comprises a physical (PHY) layer and a media access control (MAC) layer. The PHY layer and MAC layer typically interact with each other via a hardwired serial or parallel chip-to-chip interface (clock, data-valid, 4-bit parallel data), but they may also communicate via various protocols like ethernet, frame relay, or any other present or future protocol well known and contemplated by those skilled in the art. The connection between PHY layer and MAC layer can be hardware based, software based or an appropriate combination of both. More details of the functioning of PHY layer and MAC layer will be described with respect to FIG. 2, as below. For now, it is worth mentioning that the PHY layer is the first point of reception in a CMTS 104 for all upstream data packets being sent by set 102 of cable modems. Further, setup 100 may be equally suitable for a point-to-multipoint system.

Figure 2:
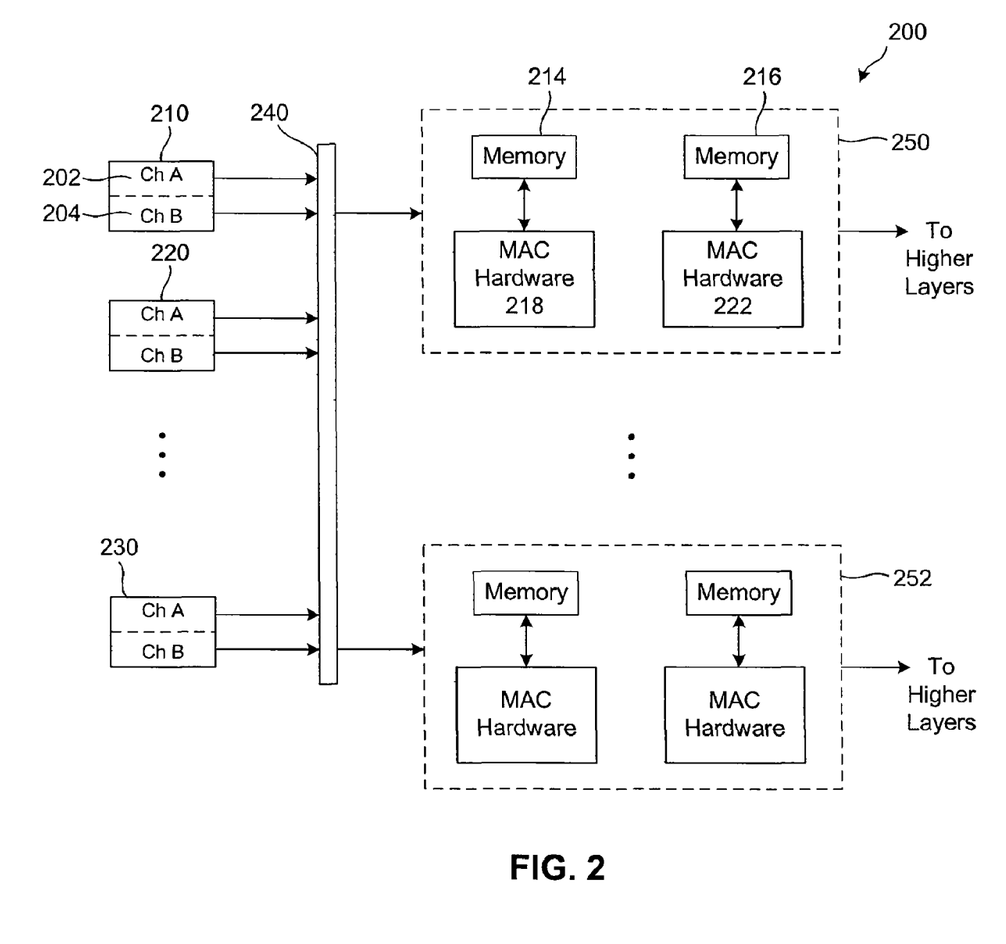
FIG. 2 illustrates flexible connectivity between PHY and MAC devices, according to an embodiment of the invention.

FIG. 2 illustrates, in more detail, a CMTS 104 (interchangeably referred to as CMTS 200, with respect to FIG. 2). A set of PHY devices is shown, including PHY devices 210-230. These receive incoming upstream data as shown by arrows 108 in FIG. 1. As described immediately above, PHY devices 210-230 form a part of the PHY layer, which is the first point of contact for upstream data packets. Upstream data packets can reach CMTS 104 by means of a wireless, wireline, fiber, or any other communication medium, well known to those skilled in the art. PHY devices 210-230 can, for example, be used for Forward Error Correction (FEC) of data packets that might traverse through network 106 and CMTS 104. Each of PHY devices 210-230 comprise input ports to connect to one or more channels. For example, PHY devices 210-230 may connect to two channels—channel 202 and channel 204, although single channel PHY devices 210-230 work just as well. All such channels like channel 202 and channel 204 on each of PHY devices 210-230 receive upstream data, as described above.

After physical layer processing is completed by PHY devices 210-230, the data from the upstream bursts is forwarded to one or more MAC devices, such as MAC hardware slice 250, via backplane switching infrastructure 240, according to the embodiment shown. In alternative embodiments, a network may be used instead of a backplane switching infrastructure 240 to connect PHY devices 210-230 with MAC hardware slices 250-252, although it is to be noted that the use of a network is not necessary for the working of any embodiment of the present invention. Further, backplane switching infrastructure 240 can be a shared data bus within a computing device. In any event, the PHY devices 210-230 (and their associated upstream channels) are not bound to any particular MAC hardware slice. As a result, the data associated with any received burst can go to any MAC hardware slice shown in part by MAC hardware slices 250-252.

MAC hardware slice 250 can, for example, comprise a bonded segment reassembly device, a part of decryption hardware, and can also be a part of a master-slave arrangement. Further MAC hardware slices 250 can comprise, for example, memory elements 214 and 216 of varying sizes, depending on specific applications, as is well known to those skilled in the art. Further, memory elements 214-216 can be associated to individual MAC hardware elements 218-222. Further still, these memory elements can be Random Access Memory (RAM), Read Only Memory (ROM), or any other type of memory well known to one skilled in the art. Memory elements 214 and 216 may act as buffering components in an event of heavy data traffic burst (i.e., heavy traffic flow).

The MAC hardware slice 250-252 to which data will be directed is determined on the basis of an SID of the data. In channel bonding, traffic from a service flow may be transmitted by cable modem(s) 110 on any of one or more upstream channel(s) 108 dynamically. The Service ID (SID) is used to identify traffic from a particular flow on a particular channel 108. To correctly perform channel bonding, a single MAC hardware slice 250 needs to receive all traffic for a particular flow, regardless of which channel that traffic arrived on. Given that the SID corresponds to a particular service flow, the data will be routed to one of MAC hardware slices 250-252 that has been handling (or has been assigned) that flow. Upstream data packets may then be outputted at an output port of a MAC hardware slice 250 and be sent for higher layer processing.

Figure 3:
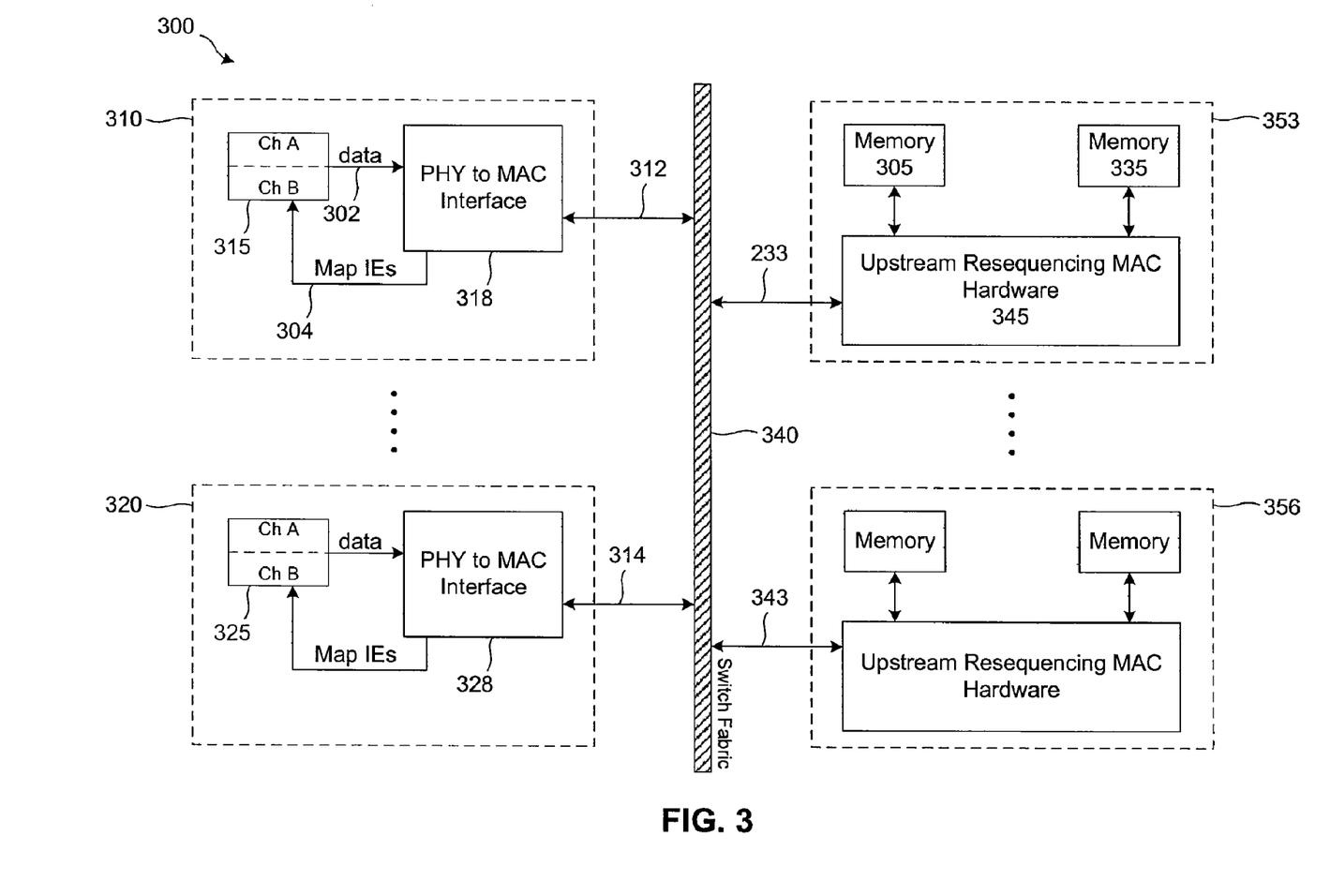
FIG. 3 illustrates the interaction between PHY and MAC devices through PHY/MAC interfaces and switching infrastructure, according to an embodiment of the invention.

An embodiment of the invention is shown in greater detail in FIG. 3. An upstream PHY slice 310 is shown, and includes a PHY device 315 and a PHY to MAC interface 318. Additional PHY slices may be present as well, such as PHY slice 320, which includes PHY device 325 and a PHY to MAC interface 328. MAC slices 353 and 356 are also shown. The PHY slices 310-320 are connected to the MAC slices 353-356 via switching infrastructure (i.e., "switchfabric") 340 in the illustrated embodiment. Again, the PHY devices and their associated upstream channels are not bound to any particular MAC hardware slice. The MAC hardware slice to which data will be directed is determined on the basis of the SID of the data; the SID corresponds to a particular service flow, and the data will be routed to the MAC hardware slice that has been handling (or has been assigned) that service flow. Such a routing can be performed dynamically. Each of PHY devices 315 and 325 handles two upstream channels in the illustrated embodiment. As shown by the shaded arrows, data on any of the four channels can be directed to either of MAC slices 353 or 356. Data received by PHY device 315 can be modulated using a 1.6 MHz Quadrature Phase Shift Keying (QPSK), 16 Quadrature Amplitude Modulation (QAM), or any other modulation technique well known to one skilled in the art.

Data processed by PHY device 315 is passed on to PHY to MAC interface 318 before being transferred to MAC devices 353-356.

In an embodiment of the invention, PHY to MAC interfaces 318 and 328 receive the upstream data output from PHY devices 315 and 325, respectively, in the order received. A look-up table (not shown) is then consulted, indexed by the SID(s) of the received data. This is used to identify a service flow to which the upstream data is associated. The service flow is then mapped to an appropriate MAC slice 353-356. This determines which MAC slice out of MAC slices 353-356 data is to be sent to. In an embodiment of the invention, a specific service flow is assigned to a particular MAC slice at the outset of the flow, and all subsequent data that is part of the flow will be sent to the same MAC slice. A service flow may begin, for example, when a cable modem first joins the system, and/or when the user elects a particular application that corresponds to a new flow, e.g., making of a phone call over the cable network, or starting of an internet browsing session. As a new flow is initiated, the look-up table can be reprogrammed as necessary, and a MAC device assigned to the new flow accordingly.

In an embodiment of the invention, the switchfabric 340 can be ethernet based. Routing of data to a particular MAC slice 353 is then performed by applying the MAC slice 353's network destination address to the data. The invention can alternatively use a network protocol other than ethernet. In addition, the switchfabric 340 is not limited to being a backplane; the switchfabric may be implemented as, for example, a network. Nor is the routing between PHY slices 310-320 and MAC slices 353-356 necessarily switched, and the routing may not require a network protocol. A shared bus may be used to connect various elements of embodiment 300, for example. MAC slice 353 may contain upstream resequencing MAC hardware 345 which is responsible for resequencing the data packets received from one or more of PHY slices 310-320 for processing by higher network layers. PHY devices 315-325 can be BCM3140 chipset and upstream resequencing MAC hardware 345 can be BCM3216 chipset, for example and not by way of limitation, both manufactured by Broadcom Corporation.

Figure 4:
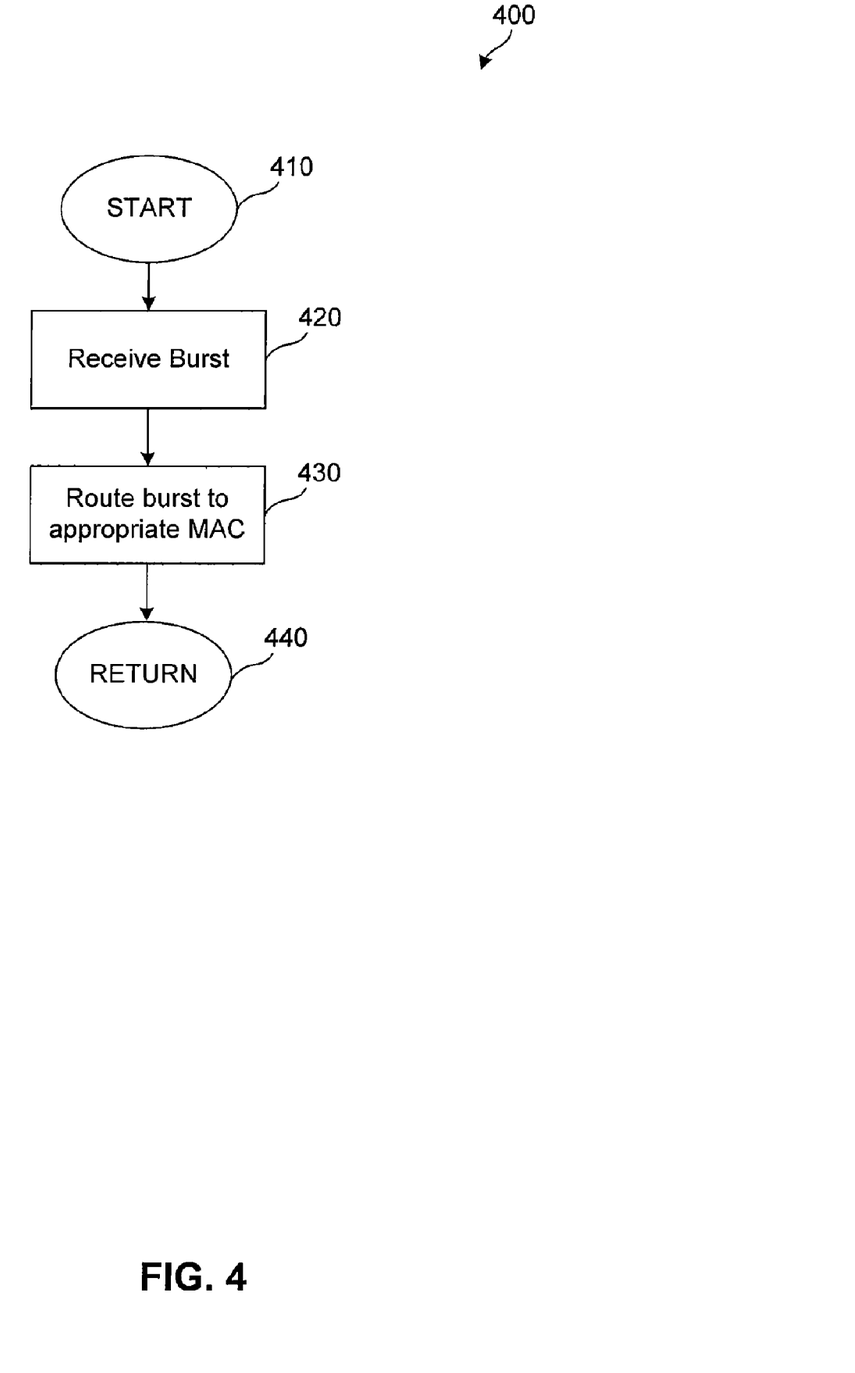
FIG. 4 illustrates the overall processing of an embodiment of the invention.

Processing of data packets according to one embodiment of the invention is illustrated generally in FIG. 4. The process begins at step 410. In step 420, an upstream burst is received at a PHY device 315. In step 430, the burst is routed to the appropriate MAC device (e.g., upstream resequencing MAC hardware 345). The process concludes at step 440.

Figure 5:
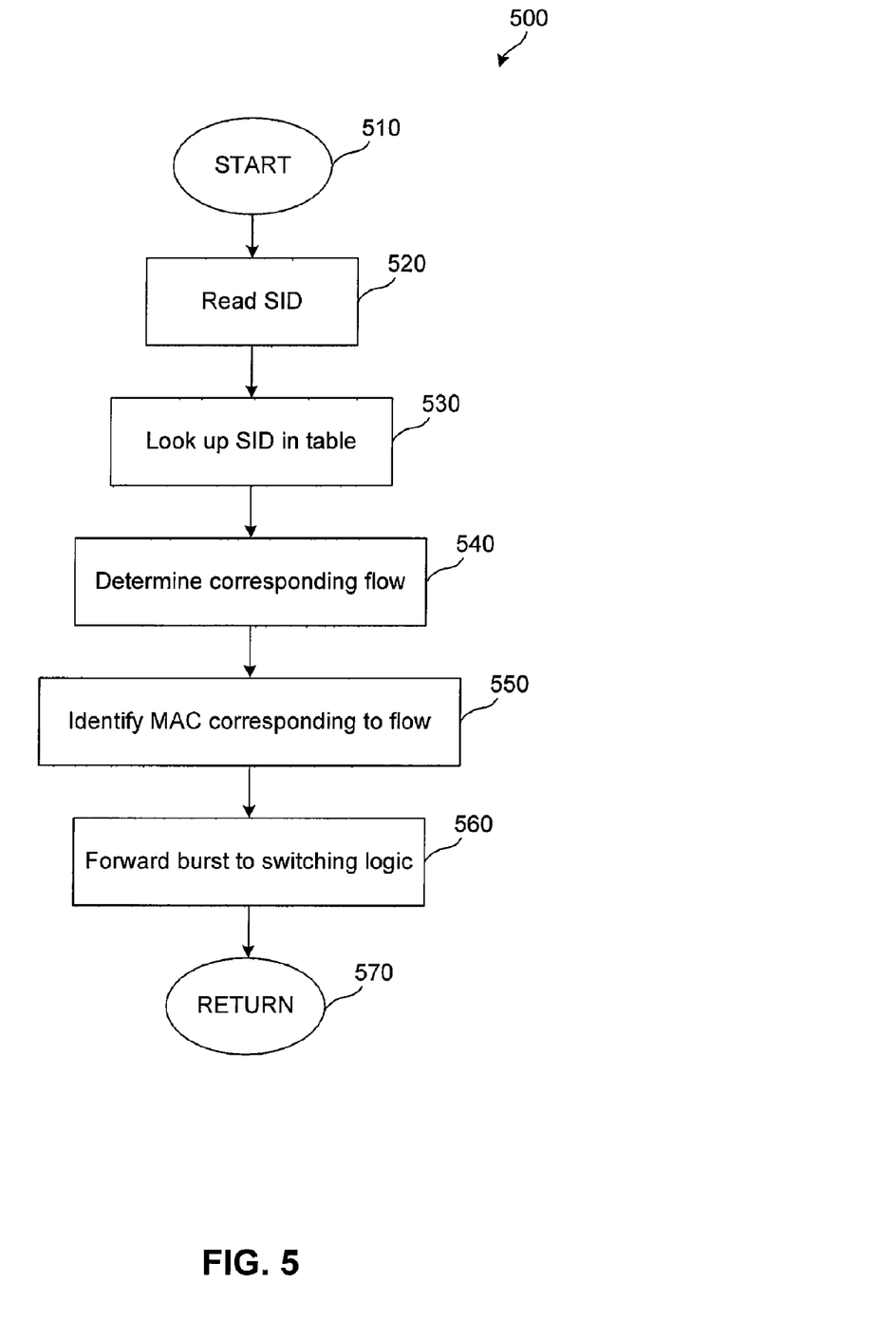
FIG. 5 illustrates the processing of an embodiment of the invention in greater detail.

The routing of the burst is illustrated in greater detail in FIG. 5. The process starts with step 510. In step 520, the SID of the burst is read. In an embodiment of the invention, this can be done at the output of the PHY device 315 by PHY to MAC interface 318, as shown in FIG. 2. In step 530, the SID is looked up in a table. This allows determination of the service flow with which the SID is associated (step 540). In step 550, the MAC device responsible for this flow is determined. In step 560, the burst is forwarded to the switching logic (i.e., backplane switching infrastructure 240 of FIG. 2) for routing to the identified MAC device. The process concludes at step 570.

EXAMPLES

The present invention is further described by means of an example. After reading this disclosure, one skilled in the art can contemplate more examples where various embodiments of the present invention can be used.

Consider a scenario where channel bonding is taking place across eight upstream channels. The SID for each burst will be read and looked up, in order to determine the corresponding service flow. Each such burst will then be routed to the MAC device (like MAC hardware 218) responsible for this service flow. A single MAC device may well see bursts that were originally received by CMTS 200 in each of the eight upstream channels. If these bursts correspond to service flows that are handled by this MAC, they will all be routed to that device. Other bursts from these channels may be associated with different service flows that are handled by one or more other MAC devices. These would be routed accordingly.

This approach of flexible connectivity between PHY slices 310-320 and MAC slices 353-356 allows for scalable configurations that would not otherwise be possible. For example, assume a 200 k packets/second MAC card and eight channels per PHY card, where each channel is coded according to a 1.6 MHz quadrature phase-shift key scheme (QPSK), where traffic is heavy and packets are relatively small. The MAC card might normally be limited to handling a total of six PHY channels, which would result in throughput that is far below the MAC device's maximum processing capability. However, using the invention described herein, eight incoming channels may be connected to a single PHY card, while six PHY cards may be connected to a single MAC device, given the above traffic parameters. This results in 48 PHY channels being handled by the single MAC device, where the MAC device would otherwise be limited to only six PHY channels. Using the invention, the system thereby takes advantage of more of the MAC device's capacity.

Moreover, if the incoming upstream channels running QPSK were to use 16 quadrature amplitude modulation (QAM) instead, the throughput of each PHY channel would double. If PHY devices are hardwired with a MAC device on a single card, the increased traffic requirement would necessitate installation of another card in order to add another MAC device. Given the invention, however, an operator now simply needs to add another MAC device to the switched network.

In the case of a system operating under the higher rate DOCSIS 2.0 or 3.0 standards, each channel might be coded according to 6.4 MHz 64 QAM. If heavy loading and relatively small packets are assumed, the invention would allow for four PHY channels to be mapped to a single MAC device. Alternatively, the invention would also allow for eight PHY channels to be mapped to a pair of MAC devices. It would then be possible for channel bonding of individual service flows to take place across all eight channels. For example, if service flow A and service flow B each occupy half of the available bandwidth on each of the eight PHY channels, the invention allows service flow A to be directed to one MAC device and service flow B to be directed to another MAC device, so that channel bonding can be completed successfully. Hence, in this example, the invention allows a MAC device with capacity equivalent to four PHY channels to successfully complete channel bonding over eight channels. Therefore, a four channel MAC device can effectively "see" eight channels even though its total capacity is equivalent to only four channels. Absent the current invention, a MAC device with a capacity of four channels would only be able to complete channel bonding across those four channels. In other words, alternatively or additionally, according to various embodiments of the present inventions, fractions of a PHY channel are being allocated or directed to a single MAC device. This can be accomplished, for example, by directing data traffic from various service flows to different MAC devices, even if the service flows were received on the same PHY channel.

It will be readily apparent to one skilled in the art that other variations in system conditions may cause further variations in the number of PHY channels which would ideally be mapped to a single MAC slice 250. By way of example but not limitation, such system conditions may include channel bit rate, channel utilization, channel packet rate, packet size, total number of flows, bit rate per flow, total number of devices per channel, and so on and so forth.

Therefore the invention has utility independent of the feature of maintaining service flows using SIDs. By providing an easily reconfigurable interconnection (e.g., the switchfabric 340 of FIG. 3) between PHY and MAC devices, and by including a MAC device that can support a varying number of PHY channels depending on available channel capacity, capabilities of CMTS 200 become more flexible.

The present invention (or any part(s) or function(s) thereof) may be implemented using hardware, software or a combination thereof and may be implemented in one or more computer systems or other processing systems. In one embodiment, the invention is directed toward one or more computer systems capable of carrying out the functionality described herein. In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. An apparatus for processing a plurality of upstream data signals received from a plurality of communication channels in a point-to-multipoint communications system, each of the plurality of upstream data signals including one or more Service IDs (SIDs) from among a plurality of SIDs, comprising:
   a plurality of physical layer (PHY) devices configured to receive one or more of the plurality of upstream data signals, each of the plurality of PHY devices being configured to determine a corresponding service flow from among a plurality of service flows for the one or more of the plurality of upstream data signals using a look-up table, the look-up table being configured to assign each of the plurality of SIDs to one or more of the plurality of service flows;
   a plurality of media access control (MAC) devices, each of the plurality of MAC devices being assigned to one or more of the service flows from among the plurality of service flows; and
   a switching infrastructure configured to route the one or more of the plurality of upstream data signals from each of the plurality of PHY devices to one or more of the plurality of MAC devices that are assigned to the corresponding service flow.

2. The apparatus of claim 1, wherein a capacity of each of the plurality of MAC devices is allocated dynamically based on system conditions.

3. The apparatus of claim 1, wherein the point-to-multipoint communications system comprises at least one of a group consisting of:
   a Data Over Cable Service Interface Specification (DOCSIS) 2.0 based system, and
   a DOCSIS 3.0 based system.

4. The apparatus of claim 1, wherein the plurality of PHY devices and the plurality of MAC devices reside in a Cable Modem Termination System (CMTS).

5. The apparatus of claim 1, wherein the plurality of upstream data signals are received by the plurality of PHY devices in bursts.

6. The apparatus of claim 1, wherein the switching infrastructure is a backplane.

7. The apparatus of claim 1, wherein the switching infrastructure is a network.

8. The apparatus of claim 7, wherein the network is a hybrid fiber-coaxial cable (HFC) network.

9. The apparatus of claim 1, wherein each of the plurality of MAC devices includes a buffer.

10. The apparatus of claim 1, wherein the upstream data is transmitted in a channel bonding network arrangement.

11. A method to dynamically route data packets between a plurality of physical layer (PHY) devices and a plurality of media access control (MAC) layer devices, comprising:
    receiving one or more of a plurality of upstream data packets from a plurality of communication channels at the plurality of PHY devices, each of the plurality of upstream data packets including one or more Service IDs (SIDs) from among a plurality of SIDs;
    determining a corresponding service flow from among a plurality of service flows for the one or more of the plurality of upstream data packets using a look-up table, the look-up table being configured to assign each of the plurality of SIDs to one or more of the plurality of service flows; and
    dynamically routing the one or more of the plurality of upstream data packets from each of the plurality of PHY devices to one or more of the plurality of MAC devices that are assigned to the corresponding service flow.

12. The method of claim 11, wherein the step of routing comprises routing over a data bus.

13. The method of claim 11, wherein the step of routing comprises routing over a network.

14. The method of claim 11, wherein the plurality of upstream data packets are channel coded according to a 1.6 MHz quadrature phase-shift keying (QPSK) scheme.

15. The method of claim 11, wherein the plurality of upstream data packets are channel coded according to a 16 Quadrature Amplitude Modulation (QAM) scheme.

16. The method of claim 11, wherein the step of routing comprises routing between channel bonded computing devices.

17. The apparatus of claim 1, wherein at least one of the plurality of PHY devices comprises:
    a PHY to MAC interface configured to determine the corresponding service flow for the upstream data based upon the one or more SIDs using the look-up table and to map the upstream data to the one or more of the plurality of MAC devices that are assigned to the corresponding service flow.

18. The apparatus of claim 1, wherein the plurality of PHY devices comprise:
    a first PHY device configured to receive a first upstream data signal from among the one or more of the plurality of upstream data signals from a first communication channel from among the plurality of communication channels and to assign the one or more of the plurality of upstream data signals to a first service flow; and a second PHY device configured to receive a second upstream data signal from among the one or more of the plurality of upstream data signals from a second communication channel from among the plurality of communication channels and to assign the one or more of the plurality of upstream data signals to the first service flow, wherein at least one of plurality of MAC devices is assigned to the first service flow, and wherein the switching infrastructure is configured to route the first upstream data signal and the second upstream data signal to the at least one of plurality of MAC devices.

* * * * *

UNITED STATES PATENT AND TRADEMARK OFFICE
CERTIFICATE OF CORRECTION

| | | |
|---|---|---|
| PATENT NO. | : 8,204,074 B2 | Page 1 of 1 |
| APPLICATION NO. | : 11/759762 | |
| DATED | : June 19, 2012 | |
| INVENTOR(S) | : Niki Pantelias | |

It is certified that error appears in the above-identified patent and that said Letters Patent is hereby corrected as shown below:

At Title Page, Item (57), Abstract, please replace "PITY" with --PHY--.

In the Claims:

At column 10, in claim 18, line 1, please replace "of plurality" with --of the plurality--.

At column 10, in claim 18, line 5, please replace "of plurality" with --of the plurality--.

Signed and Sealed this
Twenty-fifth Day of December, 2012

David J. Kappos
*Director of the United States Patent and Trademark Office*